United States Patent
Park et al.

(10) Patent No.: US 7,859,626 B2
(45) Date of Patent: Dec. 28, 2010

(54) SEMI-TRANSMISSIVE VERTICAL ALIGNMENT LIQUID CRYSTAL DISPLAY DEVICE

(75) Inventors: Ku-Hyun Park, Gyeonggi-Do (KR); Jong-Hwae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 169 days.

(21) Appl. No.: 12/285,633

(22) Filed: Oct. 9, 2008

(65) Prior Publication Data
US 2009/0096968 A1   Apr. 16, 2009

(30) Foreign Application Priority Data
Oct. 10, 2007   (KR) ............... 10-2007-0102144

(51) Int. Cl.
*G02F 1/1337*   (2006.01)
(52) U.S. Cl. ............................................ 349/130
(58) Field of Classification Search ......... 349/129, 349/130, 114, 43, 138, 42, 118
See application file for complete search history.

(56) References Cited

U.S. PATENT DOCUMENTS

| | | | | |
|---|---|---|---|---|
| 6,967,702 B2* | 11/2005 | Ishii et al. | | 349/123 |
| 7,567,322 B2* | 7/2009 | Hong | | 349/129 |
| 2004/0201807 A1* | 10/2004 | Ong | | 349/129 |
| 2007/0263152 A1* | 11/2007 | Mazaki et al. | | 349/130 |
| 2007/0268437 A1* | 11/2007 | Jung et al. | | 349/129 |
| 2010/0026936 A1* | 2/2010 | Uesaka et al. | | 349/75 |

* cited by examiner

*Primary Examiner*—Akm E Ullah
(74) *Attorney, Agent, or Firm*—McKenna Long & Aldridge LLP

(57) ABSTRACT

A liquid crystal display includes: first and second substrates with a transmissive region and a reflective region defined thereon; a reflection layer formed at the reflective region of the first substrate; a liquid crystal layer formed between the first and second substrates; a common electrode formed on the second substrate; an alignment layer formed on the second substrate and rubbed in one direction; a pixel electrode formed on the first substrate to form an electric field together with the common electrode to drive the liquid crystal layer, and having at least one electric field controller to control the direction of the electric field; and a vertical alignment layer formed on the first substrate.

6 Claims, 2 Drawing Sheets

SEMI-TRANSMISSIVE VERTICAL ALIGNMENT LIQUID CRYSTAL DISPLAY DEVICE

This application claims the benefit of Korean Patent Application No. 10-2007-0102144, filed on Oct. 10, 2007, which is hereby incorporated by reference for all purposes as if fully set forth herein.

BACKGROUND OF THE INVENTION

1. Field of the Invention

The present invention relates to a liquid crystal display (LCD) and, more particularly, to a semi-transmissive VA LCD capable of securing a wide viewing angle and also securing a light transmittance of a transmissive region and that of a reflective region.

2. Discussion of the Related Art

Generally, liquid crystal displays (LCD) are quite useful because of their characteristics such as light weight, slim design and driven at a low power consumption. Thus, LCDs are commonly used as mobile electronic devices such as notebook computers, mobile phones.

The LCD displays a desired image on its screen by controlling the amount of transmission of light according to a video signal applied to a plurality of controlling switching elements arranged in a matrix form.

The LCD includes a liquid crystal panel including a color filter substrate, an upper substrate, and a thin film transistor (TFT) substrate, a lower substrate, and a liquid crystal layer filled therebetween, and a liquid crystal panel driver that supplies a scan signal and image information to the liquid crystal panel to operate the liquid crystal panel.

Compared with a CRT (Cathode Ray Tube) or an LED (Light Emitting Diode), the LCD is not a self-emissive display device that does not emit light by itself, so it requires a backlight assembly for providing light to the liquid crystal panel.

The LCD can be divided into two types according to types of light sources: a transmissive LCD using a light source provided therein; and a reflective LCD using an external light source (e.g., solar light).

The transmissive LCD uses an internal light source using a mobile battery or the like as a power source, which consumes much power. Thus, when the transmissive LCD is applied to a mobile electronic device, a usage time is not long due to the capacity of the mobile battery, which can cause a problem in that the advantage of portability cannot be fully exerted.

In the case of the reflective LCD that uses an external light source such as solar light, when the reflective LCD is in use in a room, the intensity of the external light source is not strong, making the screen rather dark, which results in degradation of quality of screen images.

Thus, in an effort to solve these problems, a transflective LCD including characteristics of both the transmissive LCD and the reflective LCD has been proposed. With its advantage of low power consumption, the transflective LCD is easily applicable to a mobile electronic device and displays a quality screen image even in a room as well as in an outdoor space.

The transflective LCD will now be described with reference to the accompanying drawings.

The general LCD as shown in FIG. 1 is a transflective VA (Vertical Alignment) LCD including a first substrate 1 and a second substrate 2 having a transmissive region and a reflective region.

Although not shown, gate lines and data lines are formed to cross vertically and horizontally to define a plurality of pixels on the first substrate 1, and a thin film transistor (TFT) is formed at each crossing of the gate lines and data lines of each pixel. Here, a gate electrode 9 of the TFT is connected with the gate line, a source electrode 12 is connected with the data line, and a drain electrode 13 is connected with a pixel electrode 7. A reflective layer 3 having a plurality of embossed portions and a vertical alignment layer 8 are formed at a reflective region of the first substrate 1.

A color filter layer 16 for displaying color is formed on the second substrate 2. A common electrode 5 is formed on the color filter layer 16 to form a vertical electric field together with the pixel electrode 7 formed on the first substrate 1 to apply electric field to a liquid crystal layer 4. A vertical alignment layer 6 is formed on the common electrode 5.

Rib structures 19 protrude in the direction of the first substrate 1 and are formed on the second substrate 2. The rib structures 19 serve to divide the electric field formed by the pixel electrode 7 and the common electrode 5 into multi-domains, according to which the liquid crystal layer 4 forms the multi-domains as shown in FIG. 1.

However, while the rib structures 19 allow the electric field formed by the pixel electrode 7 and the common electrode 5 to form multi-domain to allow a user of the LCD to view a screen image of a wide viewing angle. The ambient region of the rib structures 19 has a relatively low light transmission efficiency, degrading a light transmittance of the transmissive region and a light reflectance (reflectivity) of the reflective region. This results in partial deterioration of the luminance of a screen image of the transflective VA LCD to degrade picture quality.

SUMMARY OF THE INVENTION

Therefore, in order to address the above matters, the various features described herein have been conceived. One aspect of the exemplary embodiments is to provide a transflective vertical alignment (VA) liquid crystal display (LCD) capable of securing a wide viewing angle and securing a light transmittance of a transmissive region and a light reflectance of a reflective region by forming at least one electric field controller at a pixel electrode of a first substrate and forming an alignment layer rubbed in one direction on a common electrode of a second substrate.

This specification discloses a transflective VA LCD including: first and second substrates with a transmissive region and a reflective region defined thereon; a reflection layer formed at the reflective region of the first substrate; a liquid crystal layer formed between the first and second substrates; a common electrode formed on the second substrate; an alignment layer formed on the second substrate and rubbed in one direction; a pixel electrode formed on the first substrate to form an electric field together with the common electrode to drive the liquid crystal layer, and having at least one electric field controller to control the direction of the electric field; and a vertical alignment layer formed on the first substrate.

Additional features and advantages of the present invention will be set forth in the description which follows, and in part will be apparent from the description, or learned by practice of the invention and the accompanying drawings.

DETAILED DESCRIPTION OF THE ILLUSTRATED EMBODIMENTS

A liquid crystal display (LCD) according to an embodiment of the present invention will now be described in detail with reference to the accompanying drawings.

Figure 1:
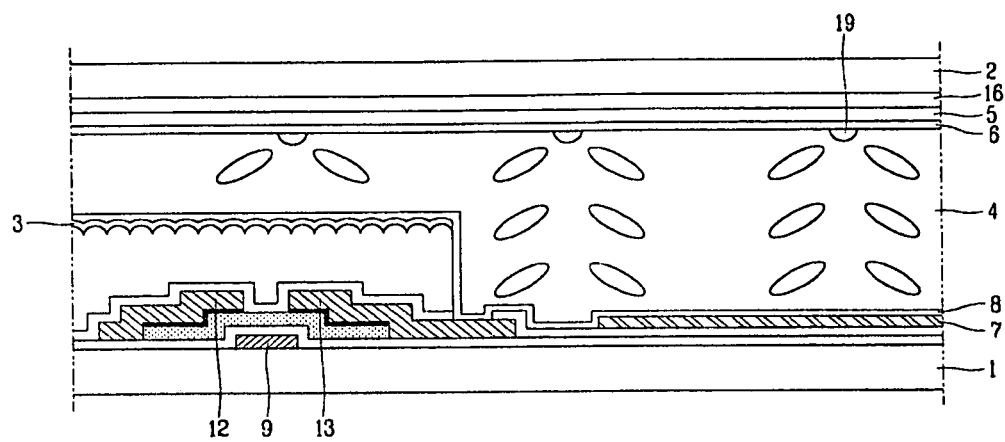
FIG. 1 is a sectional view showing a related art liquid crystal display (LCD)
Figure 2:
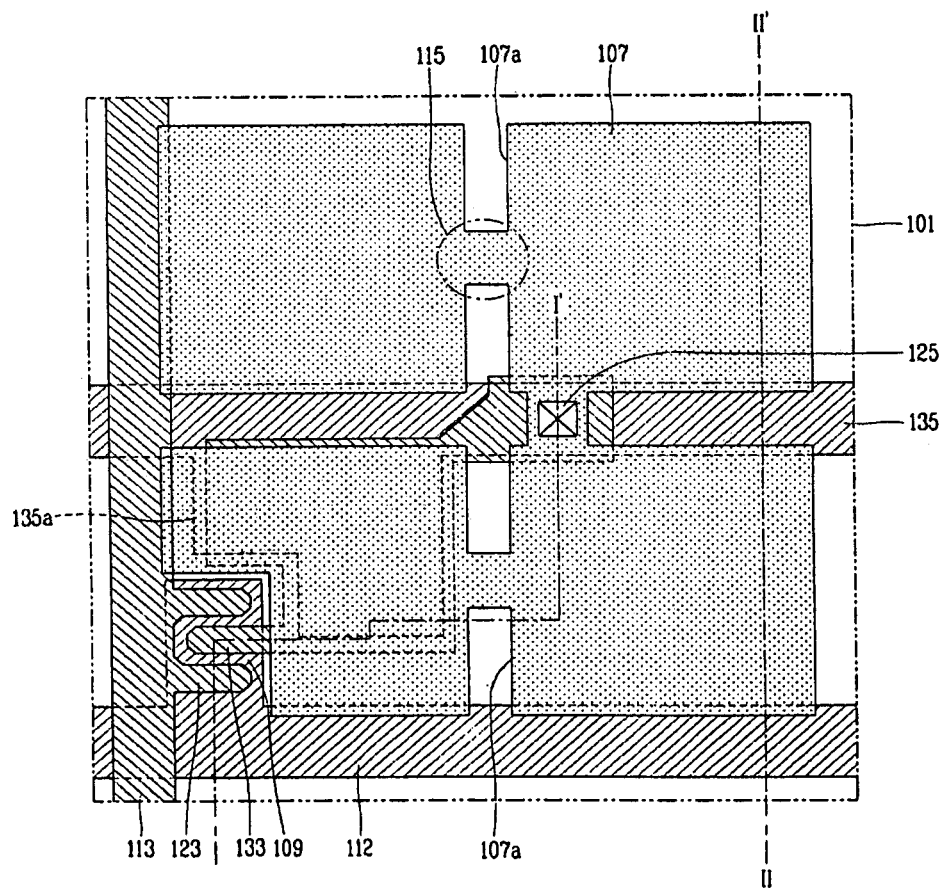
FIG. 2 is a plan view showing an LCD according to an embodiment of the present invention.
Figure 3:
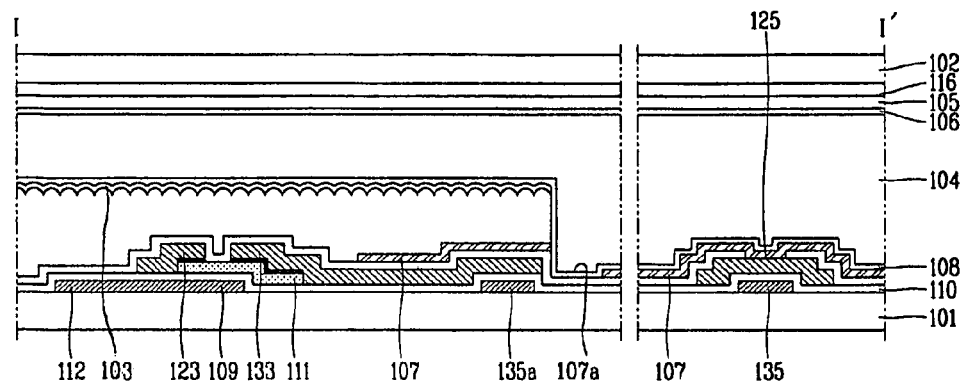
FIG. 3 is a sectional view taken along line I-I' in FIG. 2.

As shown in FIGS. 2 and 3, the LCD according to an embodiment of the present invention includes: first and second substrates 101 and 102 with a transmissive region and a reflective region defined thereon; a reflection layer 103 formed at the reflective region of the first substrate 101; a liquid crystal layer 104 formed between the first and second substrates 101 and 102; a common electrode 105 formed on the second substrate 102; an alignment layer 106 formed on the second substrate 102 and rubbed in one direction; a pixel electrode 107 formed on the first substrate 101 to form an electric field together with the common electrode 105 to drive the liquid crystal layer 104, and having at least one electric field controller 107a to control the direction of the electric field; and a vertical alignment layer 108 formed on the first substrate 101.

Each element of the LCD having such configuration will now be described.

Figure 4:
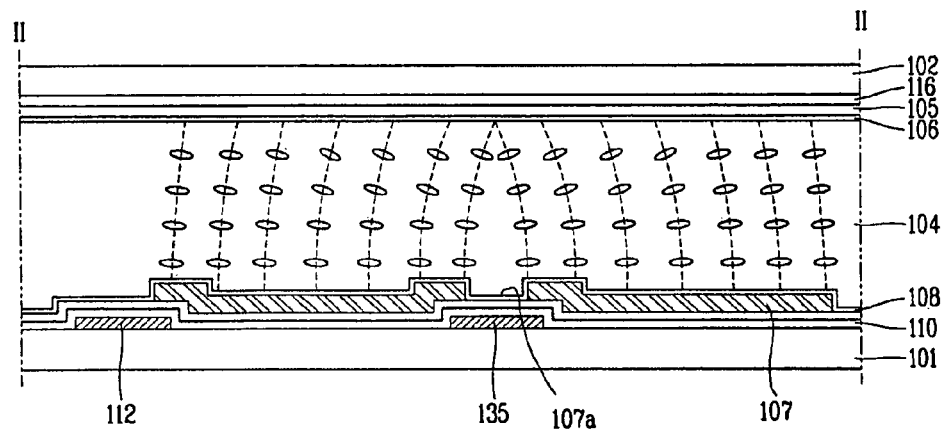
FIG. 4 is a sectional view taken along line II-II' in FIG. 2, showing how liquid crystals are driven by a pixel electrode and a common electrode.

FIG. 2 illustrates only the first substrate 101, while FIGS. 3 and 4 illustrate both the first and second substrates 101 and 102.

With reference to FIG. 3, the LCD includes the first substrate 101, a thin film transistor (TFT) array substrate, and a second substrate 102, a color filter substrate. The first and second substrates 101 and 102 include a transmissive region and a reflective region, respectively.

The liquid crystal layer 104 is formed between the first and second substrate 101 and 102, and liquid crystal of the liquid crystal layer 104 has a negative dielectric anisotropy.

The liquid crystals are driven such that their longer axes are perpendicular to an electric field. Namely, in driving the LCD, when the electric field is formed by a common voltage and a data voltage respectively applied to the common electrode 105 and the pixel electrode 107, the liquid crystals are aligned such that their longer axes are perpendicular to the electric field.

With reference to FIG. 3, a color filter layer 116 including red, green and blue sub-color filters for displaying color is formed on the second substrate 102, and the common electrode 105 is formed on the color filter layer 116. The alignment layer 106 rubbed in one direction is formed on the common electrode 105.

The alignment layer 106 is formed such that, in the fabrication process, an aligning agent is coated on the common electrode 105 of the second substrate 102, a solvent contained in the aligning agent is removed, and then, the aligning agent without the solvent is rubbed by using a rubbing unit such as a roll with a rubbing cloth wound thereon.

However, the forming of the alignment layer 106 is not limited to the above-described method and various other methods can be applicable within the scope of the present invention.

When the LCD is not driven, the rubbed alignment layer 106 make the liquid crystals aligned side by side in the same direction at a pre-tilt angle of about 85°~89° with respect to the first substrate 101. Thus, when the LCD is driven, the liquid crystals are aligned to be substantially perpendicular to the electric field formed by the common voltage and the data voltage applied to the common electrode 105 and the pixel electrode 107, and in this case, the liquid crystals are aligned side by side with the same directionality.

The liquid crystals are aligned at the earlier stage such that their longer axes are at the pre-tilt angle of about 85°~89° with respect to the first substrate 101. Thus, when the LCD is driven, the liquid crystals are driven such that their longer axes have an angle smaller than about 85°~89° with respect to the first substrate by the electric field formed by the common voltage and the data voltage applied to the common electrode 105 and the pixel electrode 107 and have the same directionality.

With reference to FIGS. 2 and 3, gate lines 112 and data lines 113 are formed to cross vertically and horizontally on the first substrate 101 to define a plurality of pixels, and each pixel includes a transmissive region and a reflective region.

A TFT is provided at each crossing of the gate lines 112 and the data lines 113 of each pixel. The TFT includes a gate electrode 109 formed on the first substrate 101, a gate insulating layer 110 formed on the gate electrode 109, a semiconductor layer 111 formed on the gate insulating layer 110, source and drain electrodes 123 and 133 formed on the semiconductor layer 111. Here, the gate electrode 109 is connected to the gate line 112, the source electrode 123 is connected to the data line 113, and the drain electrode 133 is connected to the pixel electrode 107.

With reference to FIG. 2, the pixel electrode 107 connected with the drain electrode 133 of the TFT is defined by a plurality of regions mutually connected with a certain gap therebetween, and each boundary of the plurality of regions form an electric field controller 107a.

In more detail, the pixel electrode 107 according to the embodiment of the present invention is divided into four regions with a gap of a certain width therebetween. One of the four regions of the pixel electrode 107 corresponds to a reflective region and the other remaining three regions correspond to the transmissive region. The fourth regions of the pixel electrode 107 separated with the gap of a certain width are connected by connection parts 115 having a certain width. One selected from the connection parts 115 is directly connected with the drain electrode 133 of the TFT via the contact hole 125. Here, the four regions and the three connection parts 115 of the pixel electrode 107 are integrally formed on the same layer with the same material in the fabrication process.

Of the boundaries of the four regions of the pixel electrode 107 which are separated by the gap of a certain width and mutually connected by the connection parts 115, the region excluding the connection parts 115 with a certain width forms the electric field controller 107a, and the electric field controller 107a has a shape of a recess formed in an inward direction from the side of the pixel electrode 107.

The electric field controller 107a formed at the pixel electrode 107 serves to distort the electric field formed by the common voltage applied to the common electrode 105 and the data voltage applied to the pixel electrode 107 to induce it to form a multi-domain having several directions.

Namely, with reference to FIG. 4, when the common voltage is applied to the common electrode 105 and the data voltage is applied to the pixel electrode 107 in driving the LCD, no electric field is formed at the region where the electric field controller 107 is formed at an adjacent region of the electric field controller 107a. Thus, the electric field formed by the common voltage applied to the common electrode 105 and the data voltage applied to the pixel electrode 107 is bent based on the region where the electric field controller 107a is formed.

Accordingly, the electric field formed at the liquid crystal layer 104 forms a multi-directional multi-domain based on the electric field controller 107a, and the liquid crystals of the liquid crystal layer 104 are arranged to form the multi-directional multi-domain by the bent electric field.

Namely, when the common voltage and the data voltage are applied to the common electrode 105 and the pixel electrode 107, the liquid crystals of the liquid crystal layer 104 are arranged such that their longer axes are perpendicular to the electric field formed by the common voltage and the data voltage, and in this respect, because the electric field forms the multi-domain in several directions, the liquid crystals can be divided into several regions and arranged in multiple directions.

In the above description, the pixel electrode 107 is divided into four regions which are mutually connected by the connection parts 115, but the present invention is not limited thereto. That is, the pixel electrode 107 may be divided into regions smaller than four regions or regions larger than four regions within the scope of the present invention.

For example, each of the four regions of the pixel electrode 104 may be divided into a plurality of portions to form a plurality of electric field controllers 107a to increase the degree of multi-domain formed by the electric field within each pixel.

With reference to FIGS. 2 and 3, a storage electrode 135a that overlaps with a portion of the pixel electrode 107 to form a storage capacitor is formed at each pixel on the first substrate 101.

As shown in FIG. 2, the storage electrode 135a is connected with a portion line 135 connected with a common voltage line (not shown) supplying the common voltage to the common electrode 105. The storage electrode 135a and the portion line 135 are simultaneously formed with the same material on the same layer on which the gate line 112 and the gate electrode 109 of the TFT are formed.

With reference to FIG. 3, the reflection layer 103 is formed at an upper portion of the TFT and the pixel electrode 107 at the reflective region of each pixel on the First substrate 101, and reflects light incident from an external light source such as solar light.

The reflection layer 103 formed on the TFT and the pixel electrode 107 on the first substrate 101 is not illustrated in FIG. 2.

The reflection layer 103 may have embossed and depressed portions with a plurality of curved surfaces to increase the reflection efficiency of light made incident from the external light source.

With reference to FIG. 3, the vertical alignment layer 108, the uppermost layer, is formed on the first substrate 101 in which the reflection layer 103 is formed.

The vertical alignment layer 108 formed on the first substrate 101 is an alignment layer which has not been rubbed, and is formed by coating an aligning agent on the first substrate 101 and then removing a solvent contained in the aligning agent in the fabrication process.

However, the forming of the vertical alignment layer 108 is not limited thereto and various other methods can be applicable within the scope of the present invention.

In the LCD having the structure as described above according to the present invention, because at least one electric field controller 107a is formed at the pixel electrode 107 of the first substrate 101, the electric field formed by the common voltage applied to the common electrode 105 and the data voltage applied to the pixel electrode 107 is distorted to form the multi-directional multi-domain, thereby allowing the liquid crystals of the liquid crystal layer 104 to be arranged to form the multi-directional multi-domain.

Accordingly, a wide viewing angle can be secured to improve the display quality of the LCD.

In addition, because the alignment layer 106 rubbed in one direction is formed on the common electrode 105 of the second substrate 102, the liquid crystals can be arranged to be substantially parallel to each other in the same direction at the pre-tilt angle of about 85° to 89° with respect to the first substrate 101, and when the LCD is driven, the liquid crystals are arranged to be substantially perpendicular to the electric field formed by the common voltage applied to the common electrode 105 and the data voltage applied to the pixel electrode 107 and arranged to be parallel to each other in the same direction.

Also, unlike the related art in which the rib structures are formed on the second substrate 102, there is no rib structure in the present invention. Thus, the light transmittance can be increased at the transmissive region and the light reflectance can be also increased at the reflective region.

Moreover, because the electric field controller 107a can be formed by simply changing only the shape of a photo mask applied in forming the pixel electrode 107, the fabrication process is easy.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A semi-transmissive vertical alignment (VA) liquid crystal display device comprising:
    first and second substrates with a transmissive region and a reflective region defined thereon;
    a reflection layer formed in the reflective region of the first substrate;
    a liquid crystal layer formed between the first and second substrates;
    a common electrode formed on the second substrate;
    an alignment layer formed on the second substrate and rubbed in one direction;
    a pixel electrode formed on the first substrate to form an electric field together with the common electrode to drive the liquid crystal layer, and having at least one electric field controller to control the direction of the electric field; and
    a vertical alignment layer formed on the first substrate,
    wherein the electric field controller has a shape of a recess formed in an inward direction from a side of the pixel electrode.

2. The device of claim 1, wherein liquid crystals forming the liquid crystal layer are arranged to be substantially perpendicular to the electric field formed by the common electrode and the pixel electrode, when driven.

3. The device of claim 1, wherein the pixel electrode comprises a plurality of regions mutually connected and having a certain gap therebetween,
    wherein each boundary of the plurality of regions form the electric field controller.

4. The device of claim 3, wherein each of the plurality of regions of the pixel electrode is divided into a plurality of portions, and a plurality of electric field controllers are additionally formed.

5. The device of claim 1, wherein a storage electrode is formed to overlap with a portion of the pixel electrode to form a storage capacitor on the first substrate.

6. The device of claim 1, wherein the alignment layer formed on the second substrate is aligned at a pre-tilt angle of about 85 to 89 with respect to the first substrate when the liquid crystals are not driven.

* * * * *